(12) United States Patent
Bell et al.

(10) Patent No.: US 9,410,849 B2
(45) Date of Patent: Aug. 9, 2016

(54) APPARATUSES, SYSTEMS, AND METHODS CONTROLLING TESTING OPTICAL FIRE DETECTORS

(71) Applicant: Kidde Technologies, Inc., Wilson, NC (US)

(72) Inventors: Ken Bell, Raleigh, NC (US); Robert Thebert, Raleigh, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 14/160,269

(22) Filed: Jan. 21, 2014

(65) Prior Publication Data
US 2015/0204727 A1    Jul. 23, 2015

(51) Int. Cl.
| | |
|---|---|
| *G01J 5/00* | (2006.01) |
| *G01J 5/02* | (2006.01) |
| *G08B 17/12* | (2006.01) |
| *G01J 5/08* | (2006.01) |
| *G01J 5/52* | (2006.01) |
| *G08B 29/14* | (2006.01) |

(52) U.S. Cl.
CPC ............ *G01J 5/0265* (2013.01); *G01J 5/0014* (2013.01); *G01J 5/028* (2013.01); *G01J 5/084* (2013.01); *G01J 5/0806* (2013.01); *G01J 5/0896* (2013.01); *G01J 5/522* (2013.01); *G08B 17/12* (2013.01); *G08B 29/145* (2013.01)

(58) Field of Classification Search
CPC ........................................................ G08B 29/14
USPC ........................................................ 250/338.1
See application file for complete search history.

(56) References Cited

U.S. PATENT DOCUMENTS

| | | | | |
|---|---|---|---|---|
| 4,864,146 | A * | 9/1989 | Hodges et al. | 250/504 R |
| 4,866,285 | A * | 9/1989 | Simms | 250/495.1 |
| 4,899,053 | A * | 2/1990 | Lai et al. | 250/343 |
| 5,471,055 | A * | 11/1995 | Costanzo et al. | 250/252.1 |
| 5,924,784 | A * | 7/1999 | Chliwnyj et al. | 362/234 |
| 6,179,465 | B1 * | 1/2001 | Yam | 374/2 |
| 8,564,879 | B1 | 10/2013 | Eaton et al. | |

OTHER PUBLICATIONS

Partial European Search Report dated Jun. 2, 2015 in European Application No. 15151946.9.
Extended European Search Report dated Sep. 28, 2015 in European Application No. 15151946.9.

* cited by examiner

*Primary Examiner* — David Porta
*Assistant Examiner* — Edwin Gunberg

(57) ABSTRACT

A testing device for testing infrared OFDs is provided. The testing device may comprise a body, an infrared source, a controller and a user input. The infrared source may be housed with the body. The controller may be operatively coupled to the infrared source. The controller may also be integral to the infrared source. The user input may be operatively coupled to at least one of the controller and the infrared source. The testing device may be configured to produce infrared emissions to simulate flaming fire.

8 Claims, 3 Drawing Sheets

_US 9,410,849 B2_

APPARATUSES, SYSTEMS, AND METHODS CONTROLLING TESTING OPTICAL FIRE DETECTORS

FIELD

The present disclosure relates to apparatuses, systems, and methods for testing optical flame detectors ("OFDs") and, more specifically, to a portable tester comprising a miniature infrared source.

BACKGROUND

Testing and calibration of infrared OFDs in the mid infrared relies on heat sources such as heater elements, black bodies or flaming fires. For various reasons (e.g., speed, convenience, accuracy, precision, and expense), none of these solutions are particularly commercially satisfactory. In addition, none of the solutions are particularly suitable for field-testing of an infrared flame detection system.

SUMMARY

In various embodiments, an infrared testing device may comprise a body, a solid state infrared source, a controller and a user input. The infrared source may be housed with the body. The controller may be operatively coupled to the infrared source. The user input may be operatively coupled to at least one of the controller and the infrared source.

In various embodiments, an in-factory testing system may comprise a testing device, a testing structure, an infrared OFD, and a support structure. The testing device may comprise an infrared source. The testing structure may be configured to retain the testing device at a specific orientation. The support structure may be coupled to the infrared OFD. The support structure may be configured to hold the OFD in the specific orientation.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
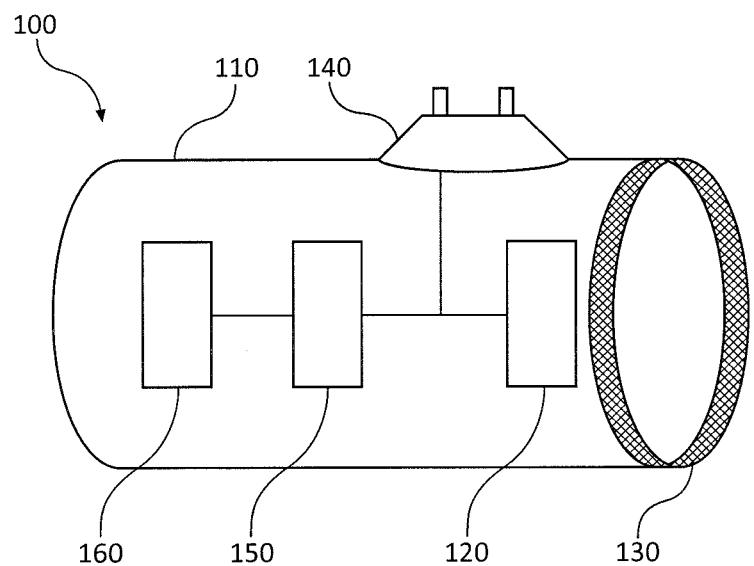
FIG. 1 illustrates a partial cross-sectional perspective view of a first field tester, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Different cross-hatching and/or surface shading may be used throughout the figures to denote different parts but not necessarily to denote the same or different materials.

Microelectromechanical systems ("MEMS") based infrared sources may enable construction of more accurate and precise test equipment to test and verify operation of flame detection sensors and/or systems. Moreover, this test equipment may reduce and/or eliminate the need for other types of heat sources (e.g., heater elements, black bodies, flaming fires, and/or the like). In various embodiments, MEMS systems may be micromachines, micro systems technology and/or the like that have a typical size from approximately 20 micrometers to approximately 1 millimeter.

In various embodiments, a testing device comprising one or more MEMS infrared emitters may be used to test infrared OFDs. The testing device may comprise multiple MEMS infrared emitters with each MEMS infrared emitter emitting a particular wavelength of infrared. For example, a testing device may comprise a first MEMS infrared emitter emitting mid infrared and a second MEMS infrared emitter emitting near infrared. Accordingly, a testing device may be capable of testing multi-channel infrared OFDs (e.g., dual channel infrared OFDs). In this regard, the infrared OFDs may detect infrared at one wavelength and/or various wavelengths. The infrared spectrum is typically regarded as electromagnetic radiation of wavelengths 700 nm to mm. Mid infrared may be regarded as between 3 µm to 8 µm. Near infrared may be regarded as between 0.75 µm to 1.4 µm. Short wavelength infrared may be regarded as between 1.4 µm to 3 µm. Wavelengths typically emitted by a MEMS infrared emitters may include, for example, approximately 0.9 µm, approximately 2.8 µm and/or approximately 4.3 µm.

In various embodiments, a MEMS infrared emitter may be a film like device (e.g., a film resistor). In this regard, the MEMS infrared emitter may have characteristics similar to a resistor in a circuit. The MEMS infrared emitter may have nearly zero mass. Nearly zero mass may allow for rapid heating and cooling of the MEMS infrared emitter (e.g., heating in milliseconds). In various embodiments, MEMS infrared source may behave like a heater. In this regard, MEMS infrared source may sweep through a plurality of infrared wavelengths (e.g., wavelengths from approximately 0.75 µm to 8 µm). In various embodiments, a MEMS infrared emitter may have a longer life than typical heating sources used for sensor testing.

In various embodiments and with reference to FIG. 1, testing device 100 may comprise a body 110 (e.g., a housing), an infrared source 120, and a lens 130. Testing device 100 may also comprise a user input 140, a controller 150 and/or a power source 160. Each of infrared source 120, controller 150, and/or power source 160 may be housed on or within body 110. Controller 150 may also be integrally formed on and/or be part of infrared source 120.

In various embodiments, infrared source 120 may comprise a single MEMS infrared emitter or an array of multiple MEMS infrared emitters and/or LED emitters. In this regard, the array may comprise a plurality of MEMS infrared emitters. For example, an array may include 64 MEMS infrared emitters. The array may also comprise one or more infrared emitters and/or one or more LED emitters. The LED emitters may be configured to produce a first set of wavelengths (e.g., shorter wavelengths such as, for example, 0.9 µm). The one or more infrared emitters may be configured to produce a second set of wavelengths (e.g., longer wavelengths, such as, for example, 2.8 µm and 4.3 µm). Moreover, the LED emitters and infrared emitters may be configured to operate at the same time or at different times, as required by a particular test. An array of emitters may also be configured to produce a sufficient infrared emission to reduce the need to control of the alignment and/or the distance between testing device 100 and a sensor being tested.

In various embodiments, user input 140 may be formed in and/or coupled to body 110. User input 140 may be operatively coupled to and/or in electronic communication with infrared source 120, controller 150 and/or power source 160. In this regard, user input 140 may be capable of communicating an input from a user to at least one of infrared source 120, controller 150 and/or power source 160. User input 140 may comprise one or more buttons, switches, or other interfaces capable of being manually manipulated. In various embodiments, however, user input 140 may comprise an electronic interface configured to receive input from another electronic device. For example, user input 140 may comprise a Universal Serial Bus ("USB") interface. In such embodiments, the USB interface of user input 140 may receive logical commands from another electronic device such as a cell phone, smart phone, tablet, personal digital assistant, laptop computer, desktop computer, and combinations of the same.

In various embodiments, lens 130 may be removably coupled to body 110. Lens 130 may be configured to protect, and/or house infrared source 120. Moreover, lens 130 may be configured to modify, filter, and/or adapt emissions from infrared source 120. Lens 130 may comprise any material suitable for transmission of at least a portion of infrared light from infrared source 120. For example, lens 130 may comprise glass and/or a polymeric material. In various embodiments, lens 130 may comprise synthetically produced sapphire. Lens 30 may be of any suitable geometry, for example, lens 30 may be spherical or aspheircal. Moreover, lens 130 may comprise one or more lenses configured to focus, adjust, or otherwise modify the infrared emissions of infrared source 120. In the regard, lens 130 may comprise one or more lens of the same or different geometries to adjust the properties of the infrared emissions of infrared source 120. Other structures, such as a diaphragm, may be configured to adjust the aperture through which the infrared emissions of infrared source 120 may be transmitted.

In various embodiments, power source 160 may be configured with voltage regulation. The voltage regulation may be configured to maintain the brightness of emissions from infrared source 120. Power source 160 may also be part of an active cooling circuit. In this regard, and in response to being activated power source 160 may create a heat sink to reduce the cooling time of infrared source 120.

Figure 2:
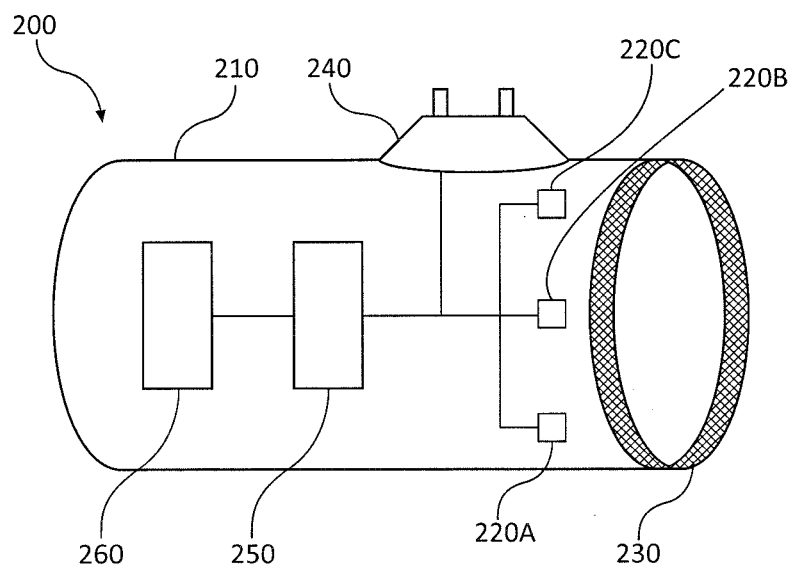
FIG. 2 illustrates a partial cross-sectional perspective view of a second field tester, in accordance with various embodiments.

In various embodiments and with reference to FIG. 2, testing device 200 may comprise a plurality of infrared sources 220 (shown as infrared source 220A, infrared source 220B, and infrared source 220C in FIG. 2). Similar to testing device 100, testing device 200 may also comprise a body 210, a lens 230, a user input 240, controller 250 and/or power source 260.

In various embodiments, the plurality of infrared sources 220 may be selectable. For example and in response to an input at user input 240, at least one of infrared source 220A, infrared source 220B, and infrared source 220C may be activated and may produce infrared emissions having wavelengths of, for example, approximately 0.9 µm, approximately 2.8 µm and/or approximately 4.3 µm. The plurality of infrared sources 220 may be caused to emit infrared simultaneously, individually, and/or in a preselected pattern.

In various embodiments and in operation, body 210 may be any suitable housing. This configuration may allow testing device 200 to be configured with significant infrared output from infrared source 220, while requiring relatively little power from power source 260 to operate (e.g., less than approximately 12 V at 100 mA). In this regard, testing device 200 may be portable and configured to be approximately the size of a household flashlight.

Figure 3:
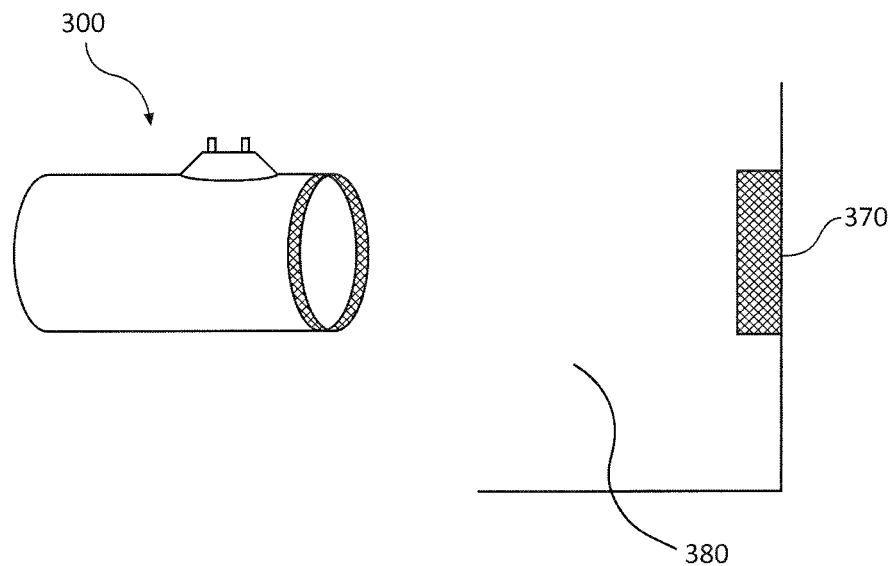
FIG. 3 illustrates a tester in operation in an environment, in accordance with various embodiments.

In various embodiments and with reference to FIG. 3, field testing of infrared OFD 370 in an environment 380 may be challenging to conventional systems. If the infrared OFD 370 should be tested using a flicker effect for activation and space around the installed infrared OFD 370 is limited, testing may be challenging and/or impossible with conventional testing systems and procedures. Conventional testing systems and procedures that are bright enough to activate infrared OFD 370 may be of significant size. Moreover, the flicker function may require a mechanical chopper to introduce the time varying output. In this regard, the constraints created by limited space in environment 380 where infrared OFD 370 is installed to make a portable testing device 300 more efficient and desirable.

Figure 4:
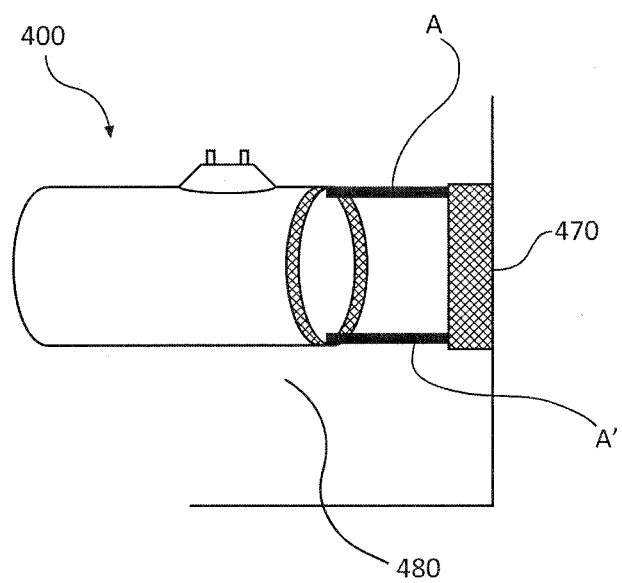
FIG. 4 illustrates a tester in operation in an environment, in accordance with various embodiments.

In various embodiments and with reference to FIG. 4, alignment of testing device 400 may improve the testing capability of testing device 400 in the field. For example, testing device 400 may be positioned at a distance A from infrared OFD 470 in an environment 480. In this regard, the distance A may be a predetermined distance provided by a supplier of testing device 400 to proper testing of infrared OFD 470. Moreover, testing device 400 may be oriented at a specific orientation A-A' to test infrared OFD 470 in an environment 480. In this regard, testing device 400 may need to be positioned at a specific orientation A-A' to be capable of performing a proper test on infrared OFD 470 in an environment 480.

In various embodiments and with reference again to FIG. 2, testing device 200 may comprise multiple infrared sources 220. Infrared sources 220 may be for example, MEMS-based high output infrared sources and/or LED based near infrared sources 220. Infrared sources 220 may be configured in an array. In this regard, infrared sources 220 may be arranged to produce emissions that simulate a fire. Infrared sources 220 may have rapid response rates. Moreover, infrared source 220 may be configured to switch on and off as necessary to achieve the flicker effect of a flame (e.g., manually based on an input to user input 240 and/or automatically based on and/or in response to commands from controller 250).

In various embodiments, testing device 200 may also be configured as an in-factory testing device. Use of a flame is typically not a very convenient or reproducible way to achieve calibration and verification of sensitivity of infrared OFDs.

Conventional in-factory test equipment may use mechanically chopped illumination of constant output infrared sources (heater elements, black bodies, flaming fires and/or the like).

In various embodiments, and in an in-factory application, infrared source 220 may be a MEMS-based high output infrared source that has reproducible output in the infrared spectrum of emissions having wavelengths of approximately 1 μm to approximately 20 μm. In testing device 200, infrared source 220 may be capable of producing full output infrared emissions in tens of milliseconds. Testing device 200 may also be capable of being shut off the infrared emissions from infrared source 220 in very short times. Moreover, testing device 200 and/or infrared source 220 may not require cooling like conventional testing systems for infrared OFDs. In various embodiments, multiple infrared sources 220 (e.g., MEMS based infrared sources) may be used to achieve the necessary testing outputs or multiple wavelengths for testing.

Figure 5:
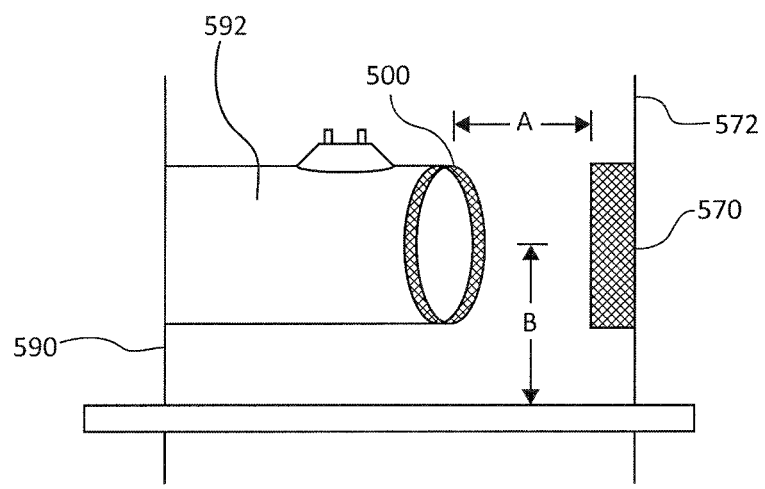
FIG. 5 illustrates a tester in operation in an environment, in accordance with various embodiments.

In various embodiments and with reference to FIG. 5, testing device 500 may be an in-factory testing device 592 that is operatively couple to a testing structure 590. Testing device 500 may comprise an infrared source as discussed herein. Testing structure 590 may be configured to position testing device 592 at an orientation (e.g., a horizontal distance A and a vertical distance B as shown in FIG. 5). Infrared OFD 570 may be mounted to a holding structure 572 in a specific orientation relative to testing device 592.

In various embodiments, the testing device described herein may be portable. Moreover, these portable testing devices may comprise low power infrared sources that are capable of testing infrared detection system as installed in the field. Moreover, these portable testing devices provide a more cost effective alternate to black body detectors or flaming fire testing systems. These portable-testing devices may be capable of achieving rapid emission response time. In this regard, the testing devices may be capable of simulating flame flicker without the need or mechanical chapping of the radiation. These testing devices may also be capable of more precise testing and verification of infrared OFDs in manufacturing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An infrared testing device comprising:
    a body,
    a power source;
    a first solid state infrared source in electronic communication with the power source and configured to produce a first infrared emission having a first wavelength,
        wherein the first solid state infrared source is configured to switch on and off to achieve a flicker effect of a flame and to sweep through a plurality of infrared wavelengths;
    a second solid state infrared source in electronic communication with the power source and configured to produce a second infrared emission having a second wavelength;
    a third solid state infrared source in electronic communication with the power source and configured to produce a third infrared emission having a third wavelength;
    a lens coupled to the body and configured to at least one of modify, filter or adapt emissions from at least one of the first solid state infrared source, the second solid state infrared source or the third solid state infrared source;
    an active cooling circuit configured to reduce a cooling time of at least one of the first solid state infrared source, the second solid state infrared source, or the third solid state infrared source;
    a controller operatively coupled to the first solid state infrared source, the second solid state infrared source and the third solid state infrared source,
        wherein the controller is configured to operate the first solid state infrared source, the second solid state infrared source and the third solid state infrared source simultaneously in response to a first input, individually in response to a second input and in a preselected pattern in response to a third input; and
    a user input operatively coupled to at least one of the controller and the infrared source.

2. The infrared testing device of claim 1, wherein the first infrared source, the second infrared source, and the third infrared source are arranged as an array.

3. The infrared testing device of claim 1, wherein the testing device is portable.

4. The infrared testing device of claim 1, wherein the testing device is battery powered.

5. The infrared testing device of claim 1, wherein at least one of the first solid state infrared source, the second solid state infrared source or the third solid state infrared source is a MEMS based infrared source.

6. An in-factory testing system, comprising:
a testing device having a lens and an infrared source, the infrared source configured to emit a plurality of infrared emissions having wavelengths between 1 µm and 20 µm,
wherein the infrared source is configured to switch on and off to achieve a flicker effect of a flame and to sweep through the plurality of infrared wavelengths;
an active cooling circuit configured to reduce a cooling time of the infrared source;
a controller operatively coupled to the infrared source,
wherein the controller is configured to operate the infrared source to output various combinations of wavelengths based on an input,
wherein the lens is configured to at least one of modify, filter or adapt emissions from the infrared source;
a testing structure configured to retain the testing device at a specific orientation;
an infrared OFD; and
a support structure coupled to the infrared OFD and configured to hold the OFD in a predetermined orientation relative to the testing device.

7. The in-factory testing system of claim 6, wherein the infrared source is a MEMS device.

8. The in-factory testing system of claim 6, wherein the infrared source is an array of infrared sources.

* * * * *